Sept. 18, 1956  L. G. SIMJIAN  2,763,153
SUPERSONIC EXPLORING DEVICE
Filed April 21, 1954  2 Sheets-Sheet 1

LUTHER G. SIMJIAN
INVENTOR

BY Ralph E. Bitner
ATTORNEY

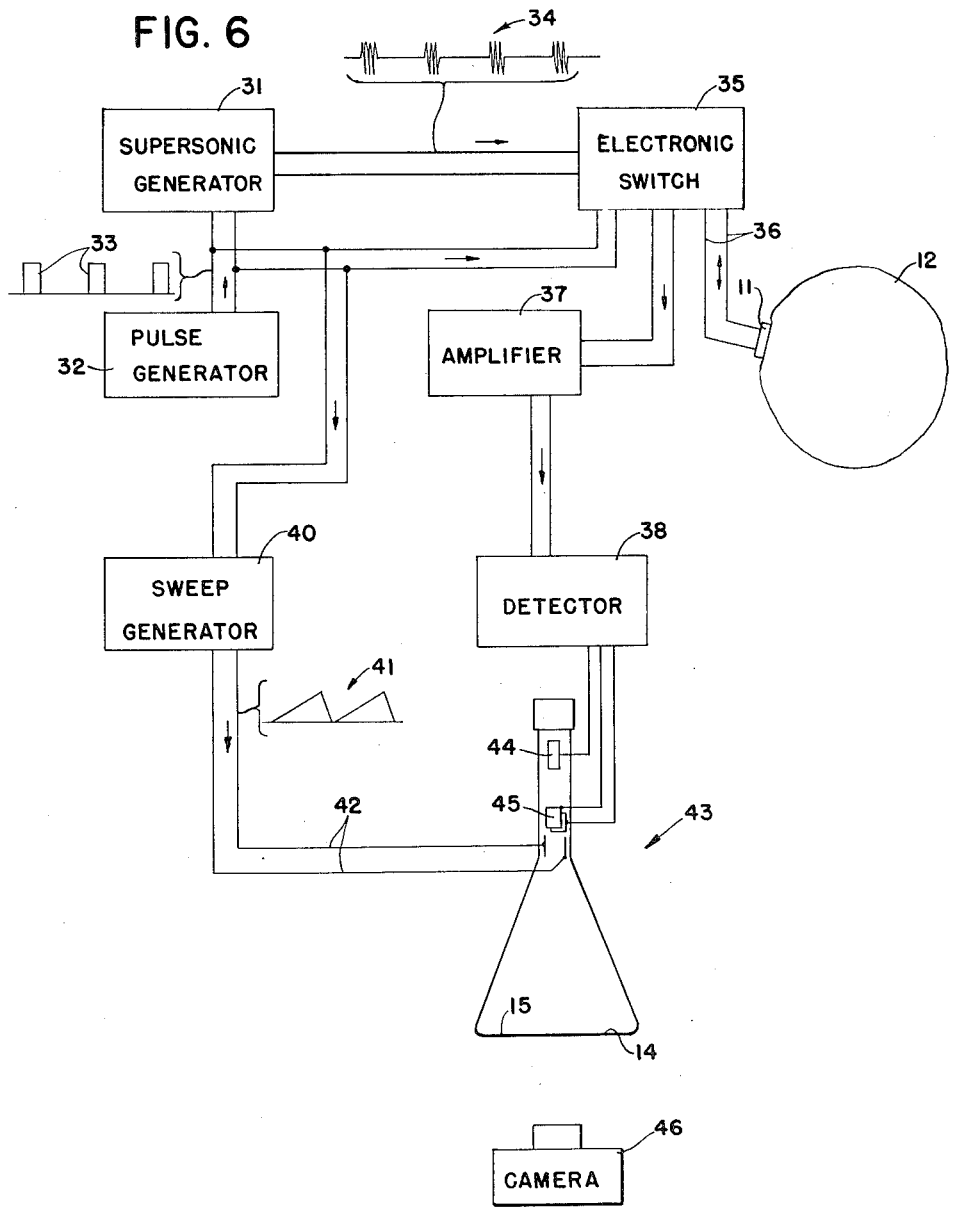

United States Patent Office 2,763,153
Patented Sept. 18, 1956

2,763,153

SUPERSONIC EXPLORING DEVICE

Luther G. Simjian, Greenwich, Conn., assignor to The Reflectone Corporation, Stamford, Conn., a corporation of Connecticut Application April 21, 1954, Serial No. 424,637

4 Claims. (Cl. 73—67.8)

This invention relates to a combination sound transmitter and receiver used for exploratory purposes on bodies that are generally opaque to visible light. The invention has particular reference to a system of supersonic sound exploration for investigating the human body.

As used throughout the specification and claims, the term supersonic frequency refers to a range of frequencies which lie between 20,000 and 20,000,000 cycles per second.

Supersonic exploring devices have been used for the examination of solid objects such as metallic rods, railroad rails, and thin sheets of metal. The scheme generally used comprises a crystal transducer which sends out an unmodulated wave of high frequency with manual means for changing the frequency. When the thickness of the material is equal to one-half the wave length resonance occurs and a measuring instrument in the supply circuit can be calibrated to indicate the thickness of the sheet. Other systems employing a frequency modulated wave and delay lines have been employed but all have been applied to solid objects.

The present invention employs a sound transducer which sends a directed beam of sound energy into a portion of the body and is sensitive to deflected sound energy which is incident upon it from the same direction. This directional effect makes possible an accurate exploration of different parts of the body and reduces reflections and spurious responses from unwanted directions. The method here described employs short trains of sound energy applied at regular pulse rates. The reflections of such wave trains are examined on a display device such as a cathode ray oscillograph. The pattern of these reflected waves can be interpreted by an experienced operator and much valuable information can be obtained from them regarding the bone composition and also regarding other cavities and structures within the body.

One of the objects of this invention is to provide an improved sound exploring device which avoids one or more of the disadvantages and limitations of prior art arrangements.

Another object of the invention is to simplify the exploration of the cavities and internal structures of the human body.

Another object of the invention is to enable an operator to investigate the internal structure of a body and make the results of such investigation visible on a screen where they can be seen by others as well as the operator.

Another object of the invention is to improve the method of investigating the human body by sound means wherein a single sound transducer is employed.

Another object of the invention is to insure positive uniform contact with the surface of the body by the use of a pressure gauge.

The invention includes a sound transducer for exploring opaque objects having variations in density and includes a means for generating sound wave trains and the application of this energy to the surface of the opaque object. The sound transducer then receives the reflected waves which are due to density variations within the object. These reflected pulses are amplified and displayed on a chart having a time base.

One feature of the invention includes a sound transducer which projects a beam of sound energy in a well defined direction and which receives reflected sound energy only from the same direction.

Another feature of the invention includes a pressure gauge attached to the sound transducer which shows an operator the pressure of the transducer face against the body surface.

For a better understanding of the present invention, together with other and further objects thereof, reference is made to the following description taken in connection with the accompanying drawings.

Fig. 6 is a diagram of connections in block form, showing the supersonic generator, the transmitting circuit, the receiving circuit, and the switching means which alternately connects the transducer as a transmitter and as a receiver.

Figure 1:
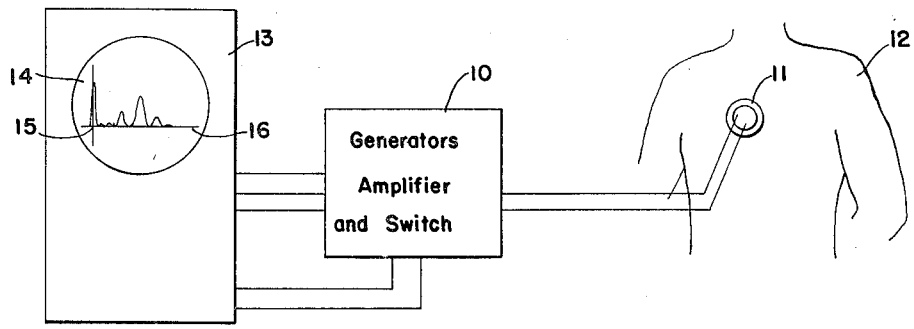
Fig. 1 is a view of the apparatus, partly schematic, showing the application of a sound transducer to a part of the human body.

Referring now to Fig. 1 a signal generator 10 is shown in block form and includes the amplifier and the electronic switch which controls the transmission of sound energy. A sound transducer 11 is connected to the generator 10 and is composed of a single piezoelectric crystal such as barium titanate arranged between two conductive films so that upon the application of an alternating current voltage the crystal will vibrate in a mode similar to a piston, the entire surface next to the body moving in a uniform manner toward and away from the other parallel surface.

It is a well known fact that a radiator such as described above will produce a directed beam of sound energy provided the dimensions of the radiating surface are large in comparison to the wave length of the sound emitted. For this reason supersonic vibrations are employed, a convenient frequency being 600,000 cycles per second having a wave length in air of approximately one-fiftieth of an inch and a wave length in water of one-tenth of an inch. In order to produce a directed beam within the human body which has a density approximately equal to that of water the radiator surface should be at least one inch in diameter.

Associated with the signal generator 10 is a display device 13 which contains a fluorescent screen 14 as the end of a cathode ray tube. The circuit within the display device 13 and the signal generator 10 is similar to the circuits used in radar, wherein a wave train of high frequency is generated and first transmitted then received by the same transmitting components and shown on a display device which is generally a cathode ray tube. The present system differs from radar in that sound energy is transmitted from a sound transducer instead of sending a radio wave from an antenna. The distances of transmittal are very much shorter than the usual radar range but since sound energy is transmitted and received, the speed of transmission is much slower and there is ample time to switch from a transmitting arrangement to a receiving arrangement during the time the sound travels only a few inches. Because of the proximity of the objects being investigated the ratio of reflected power to transmitted power is reasonably large and for this reason ultra-sensitive receiver circuits are not required.

If a cathode ray tube is employed a zero or starting point 15 is designated at one side of the fluorescent screen and a sweep generator is employed to move the spot to the right as is common practice in oscilloscopes of this character. Since the transmitted wave train is always considerably stronger than the reflected waves a portion of this signal will always be seen on the scope at the zero line. The pattern of indications to the right of the zero line is due to the variation in density within the body and may be caused by bones or cavities. It should be noted that the indications on screen 14 are all above a zero line 16, this being due to the fact that they have been demodulated by a detector and filter circuit which eliminates the supersonic waves. While this detection circuit is not absolutely necessary it is more practical and much easier to adjust.

Figure 2:
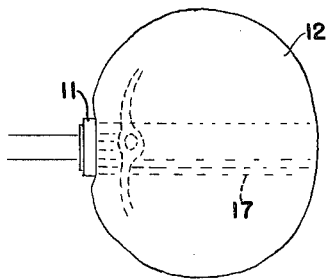
Fig. 2 is a sectional drawing of a sound transducer applied to a portion of a body and illustrates the directional character of the sound beam.

Fig. 2 is a section drawing showing some of the elements of an opaque body 12 which is being investigated by the transducer 11. It will be noted that the sound energy, illustrated by the dotted lines, travels in a well defined beam 17 and does not spread out. The use of a single beam simplifies the examination of the interior structure and eliminates many of the reflections that would otherwise confuse the operator.

Figure 3:
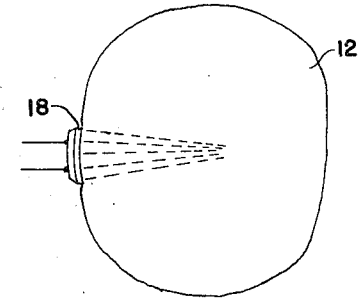
Fig. 3 is a sectional drawing similar to Fig. 2 but indicating the manner in which a sound beam may be focussed within a body.
Figure 4:
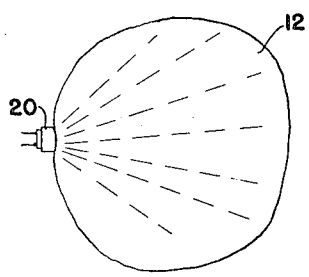
Fig. 4 is a sectional drawing similar to Fig. 2 but showing a sound transducer which does not have a directional characteristic.

Fig. 3 illustrates an alternate type of transducer 18 which not only has an area which is large in comparison to the wave length transmitted but also has a slight curvature formed on its emitting surface. This tends to focus the beam as illustrated and facilitates the examination of minute spaces within the body. For the sake of comparison a small transducer 20 is shown in Fig. 4 which employs wave lengths which are equal in size to the transducer diameter or of a longer dimension. The sound produced by such a structure is completely divergent and spreads out in all directions throughout the body space. Such a transducer is also sensitive to sound energy coming from all directions when the transducer is used as a receiver.

Figure 5:
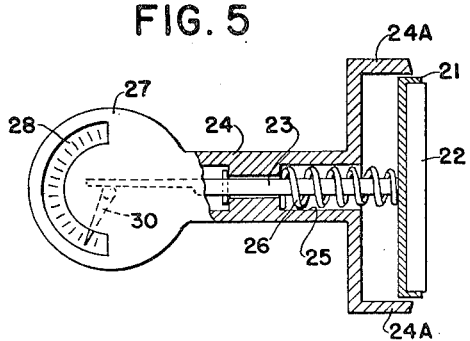
Fig. 5 is a plan view, with some parts in section, of a pressure measuring structure which is attached to the transducer.

It is important to have a good contact between the transducer surface and the surface of the body therefore a pressure responsive device shown in Fig. 5 is employed to inform the operator when an adequate contact has been attained. The device comprises a crystal holder 21 which holds a piezoelectric transducer 22. The transducer crystal is provided with the usual foil electrodes cemented to opposite crystal surfaces and the electrodes are connected to flexible conductors (not shown in Fig. 5) which are connected to generator 10. A guide rod 23 is secured to the back face of the holder and acts as a shaft within a main casing 24. The casing 24 may include a protecting shell 24A which surrounds the crystal holder 21. Within the housing a cut-out portion 25 is formed to hold a helical spring 26 which is used to provide the resiliency for the pressure contact. At the other end of the housing a circular case 27 contains a calibrated scale 28 and a moving pointer which is turned by an extension of shaft 23. For the best results the operator presses this structure against the outside surface of the body to be explored and holds the crystal in contact by manual means so that the pointer 30 remains at a predetermined position on the scale 28.

The wiring diagram shown in Fig. 6 shows the parts of the circuit in greater detail. A supersonic generator 31 generates an electric wave having a frequency which lies within the supersonic range. The generator is controlled by a pulse generator 32 which delivers a series of short direct current pulses 33 to a control circuit within the supersonic generator 31. The circuits are arranged so that supersonic frequencies are emitted only during the time the pulses are received and the train of pulses which results is indicated at 34. This series of wave trains is applied to an electronic switch 35 which also is controlled by the direct current pulses 33 delivered by the pulse generator 32 so that the supersonic power from generator 31 is switched to transducer 11 over conductors 36 during the time the pulse generator is supplying a pulse. At other times, the time interval between pulses, the energy that may be received by the transducer 11 due to reflections within the body 12 is switched to an amplifier circuit 37 where it is amplified in power and then sent to a demodulator and filter circuit 38. The switching circuit 35 may be any one of a number of electronic switching devices, well known in the electronic art, such as a switching circuit described in the General Electric pamphlet ET–T840 published February 1954. This pamphlet describes the application of electron pentode 6AR8, a sheet beam tube built especially for high speed electronic switching. It is not necessary to employ vacuum tubes for this purpose since biased crystal diodes can also be used. Patents 2,557,729 and 2,590,950, issued respectively on June 19, 1951, and April 1, 1952, to J. P. Eckert, Jr., et al. illustrate the applications of such circuits.

The pulse generator 32 also controls a sweep generator 40 which generates a saw-tooth wave such as illustrated at 41, these pulses being produced in synchronism with the pulses produced by the pulse generator. The saw-tooth wave is applied over conductors 42 to a pair of electrostatic deflection plates within a cathode ray tube 43. The cathode ray tube contains an electron gun 44 and a pair of deflection plates 45 which are connected to the output circuit of detector 38. A camera 46 is employed to make a permanent record of the reflection pattern produced by screen 14.

The operation of this circuit is as follows: When the pulse generator 32 applies a direct current pulse 33 to the supersonic generator 31 it also controls the electron switch 35 to send the resultant wave train 34 to the transducer 11 and a directed beam of sound energy is sent into the body 12. As soon as the direct current pulse 33 ends the power generated by generator 31 stops and at the same time the electronic switch 35 switches conductors 36 to the input of amplifier 37 thereby transmitting only the reflected part of the sound energy to the amplifier circuit. When the amplifier output has been demodulated it is applied to plates 45 in the cathode ray tube 43 which move the illuminated spot in a vertical direction. The sweep generator causes the spot to be moved from a zero position 15 to the right during the time that the reflected sound energy is being received and therefore the pattern of reflected energy is made available on screen 14 to an operator or for a permanent photographic record. The system as described is especially adapted to investigate the changes in the interior of the body rather than to make a determination of the exact position of the various components. For example, after a bone fracture has occurred and the bone starts to knit, the progress of the recovery can be watched by using the above described apparatus each week. At the time of the fracture the oscillograph trace will show a discontinuous reflection at the fracture position. As the bone heals and its parts are knit together the reflected envelope is more continuous and when fully healed the received trace shows no discontinuity. In this manner the recovery of a fracture may be easily and cheaply followed. Other changes in vital organs and body cavities may be followed in a similar manner.

The above described system is the preferential manner of controlling the generated energy but it should be pointed out that the system will still work if a continuous supersonic wave is applied to the electronic switch 35. When the switch is operated by the pulse generator the supersonic wave is eliminated from the transducer conductors. However, this latter system produces excessive cross talk and is more difficult to adjust.

While there have been described and illustrated specific embodiments of the invention, it will be obvious that various changes and modifications may be made therein without departing from the field of the invention which should be limited only by the scope of the appended claims.

I claim:

1. A supersonic exploring device for examining the body of a living animal beneath its surface comprising, means for generating alternating electrical energy having a frequency within the supersonic range, modulating means for converting said energy into a series of wave trains each having a predetermined length and period, a transducer connected to said generating means for converting said electrical wave trains into sound energy wave trains, means for applying said sound energy to the surface of said body, a pressure indicating means secured to said transducer for indicating the pressure of the transducer on the surface of the body, switching means controlled by said modulating means for switching said transducer from the generating means to a receiving circuit, said receiving circuit including an amplifier and a display device for showing indications of the reflected sound wave trains within the body.

2. A supersonic exploring device for examining the body of a living animal beneath its surface comprising, means for generating alternating electrical energy having a frequency within the supersonic range, a generator of direct current pulses connected to said alternating generating means for modulating said electrical energy and producing a series of wave trains each having a predetermined length and period, a transducer connected to said generating means for converting said electrical wave trains into sound energy wave trains, means for applying said sound energy to the surface of said body, a pressure indicating means secured to said transducer for indicating the pressure of the transducer on the surface of the body, switching means controlled by said direct current generator for switching said transducer from the generating means to a receiving circuit, said receiving circuit including an amplifier and a display device for showing indications of the reflected sound wave trains within the body.

3. A supersonic exploring device as set forth in claim 2 wherein said switching means operates at the conclusion of each of said wave trains.

4. A supersonic exploring device as set forth in claim 2 wherein said receiving circuit includes a rectifying and filtering circuit.

References Cited in the file of this patent
UNITED STATES PATENTS

| | | |
|---|---|---|
| 2,280,226 | Firestone | Apr. 21, 1942 |
| 2,549,895 | De Lano | Apr. 24, 1951 |
| 2,562,449 | De Lano | July 31, 1951 |